US008583417B2

(12) United States Patent
Sumita et al.

(10) Patent No.: US 8,583,417 B2
(45) Date of Patent: Nov. 12, 2013

(54) TRANSLATION DEVICE AND COMPUTER PROGRAM PRODUCT

(75) Inventors: Kazuo Sumita, Kanagawa (JP); Michiaki Ariga, Kanagawa (JP); Tetsuro Chino, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/413,791

(22) Filed: Mar. 7, 2012

(65) Prior Publication Data

US 2012/0221323 A1 Aug. 30, 2012

Related U.S. Application Data

(63) Continuation of application No. PCT/JP2009/066677, filed on Sep. 25, 2009.

(51) Int. Cl.
*G06F 17/28* (2006.01)

(52) U.S. Cl.
USPC ......... 704/3; 704/2; 704/4; 704/275; 704/277

(58) Field of Classification Search
USPC ..................................... 704/3, 2, 4, 275, 277
See application file for complete search history.

(56) References Cited

U.S. PATENT DOCUMENTS

| | | | | |
|---|---|---|---|---|
| 5,854,997 | A * | 12/1998 | Sukeda et al. | 704/3 |
| 7,346,515 | B2 | 3/2008 | Mizutani et al. | |
| 7,835,914 | B2 | 11/2010 | Mizutani et al. | |
| 2006/0025091 | A1 * | 2/2006 | Buford | 455/154.2 |
| 2007/0073745 | A1 * | 3/2007 | Scott et al. | 707/100 |
| 2008/0215338 | A1 * | 9/2008 | Mizutani et al. | 704/277 |

FOREIGN PATENT DOCUMENTS

| | | |
|---|---|---|
| JP | 07-105220 | 4/1995 |
| JP | 2003-030187 | 1/2003 |
| JP | 2006-012179 | 1/2006 |
| JP | 3962766 | 5/2007 |

OTHER PUBLICATIONS

Reithinger, Norbert, et al. "Predicting dialogue acts for a speech-to-speech translation system." Spoken Language, 1996. ICSLP 96. Proceedings., Fourth International Conference on. vol. 2. IEEE, 1996.*
International Search Report for International Application No. PCT/JP2009/066677 mailed on Dec. 8, 2009.
Written Opinion for International Application No. PCT/JP2009/066677 mailed on Dec. 8, 2009.

* cited by examiner

*Primary Examiner* — Vincent P Harper
(74) *Attorney, Agent, or Firm* — Turocy & Watson, LLP

(57) ABSTRACT

According to an embodiment, a translation unit translates a first sentence in a first language into a sentence in a second language using parallel translations. A next utterance table includes first identification information distinguishing between a sentence in the first language and a sentence in the second language included in the parallel translation and includes second identification information identifying a sentence previously selected as the next utterance of the sentence indicated by the first identification information. An acquiring unit acquires next utterance candidates, which are sentences indicated by the second identification information associated with the first identification information of the first sentence. If the selected next utterance candidate is the first language, the translation unit translates the selected next utterance candidate into the second language. If the selected next utterance candidate is the second language, the translation unit translates the selected candidate into the first language.

6 Claims, 12 Drawing Sheets

1
20 SELECTION UNIT
60 SELECTION RECEIVING UNIT
65 UPDATE UNIT
50 STORAGE UNIT
54 NEXT UTTERANCE TABLE STORAGE UNIT
52 PARALLEL TRANSLATION STORAGE UNIT
70 TRANSLATION UNIT
75 ACQUIRING UNIT
30 INPUT UNIT
85 INPUT RECEIVING UNIT
90 RECOGNITION UNIT
95 SEARCH UNIT
80 OUTPUT CONTROL UNIT
82 DISPLAY CONTROL UNIT
84 SPEECH CONTROL UNIT
10 DISPLAY UNIT
40 SPEECH OUTPUT UNIT

FIG.4

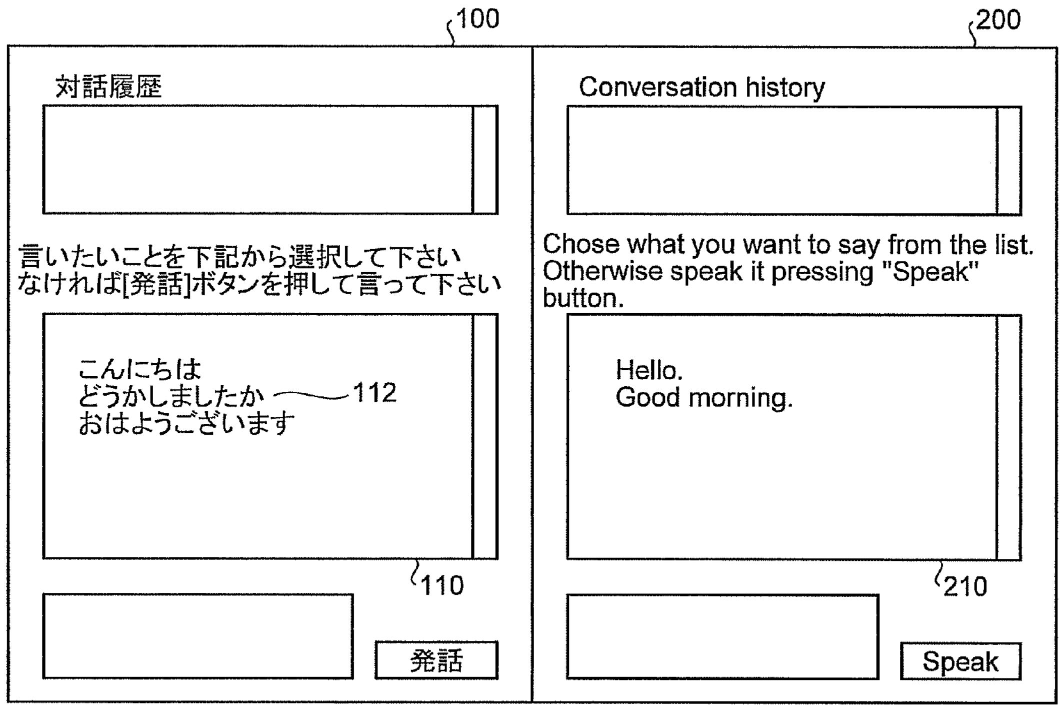

FIG.5

| ID | JAPANESE SENTENCE | FRE-QUENCY OF USE | ENGLISH SENTENCE | FRE-QUENCY OF USE |
|---|---|---|---|---|
| 00001 | こんにちは 120 | 390 | Hello. 220 | 238 |
| 00002 | さようなら | 211 | See you. | 125 |
| 00003 | ありがとうございます | 53 | Thank you. | 321 |
| 00004 | どうしましたか 112 | 419 | What's wrong with you? | 5 |
| 00005 | 上着を脱いで下さい | 316 | Put off your jacket. | 0 |
| 00006 | 大きく息を吸って下さい | 310 | Inhale deeply. | 0 |
| 00007 | このベッドに寝てください | 290 | Lay yourself down on this bed. | 0 |
| 00008 | 顔色が悪いですね | 115 | You look pale. | 0 |
| 00009 | 頭が痛いんです 121 | 0 | I have a headache. 221 | 115 |
| 00010 | おなかが痛いんです | 0 | I have a stomachache. | 99 |
| 00011 | 注射して下さい | 0 | Give me an injection. | 32 |
| 00012 | 目がちくちく痛みます | 0 | I have a stabbing pain in my eye. | 14 |
| 00013 | 右ですか左ですか | 35 | Right or left? | 35 |
| 00014 | お薬を処方します | 194 | I'll write out a prescription. | 194 |
| ~ | ~ | ~ | ~ | ~ |

FIG.6

| FIRST IDENTIFICATION INFORMATION | | SECOND IDENTIFICATION INFORMATION | | FREQUENCY INFORMATION | | |
|---|---|---|---|---|---|---|
| | ID1 | LANGUAGE TYPE 1 | ID2 | LANGUAGE TYPE 2 | FREQUENCY OF SELECTION | TOTAL FREQUENCY |
| 130 | 00001 | J | 00001 | E | 49 | 255 |
| | 00001 | J | 00210 | J | 20 | 135 |
| | 00001 | J | 00129 | J | 5 | 135 |
| | 00001 | J | 00002 | E | 23 | 255 |
| | 00001 | J | 09708 | E | 21 | 255 |
| 131 | 00004 | J | 00009 | E | 30 | 229 |
| | 00004 | J | 00010 | E | 21 | 229 |
| 133 | 00004 | J | 00008 | J | 17 | 190 |
| | 00004 | J | 00921 | E | 10 | 229 |
| 134 | 00004 | J | 00439 | J | 10 | 190 |
| | ~ | ~ | ~ | ~ | ~ | ~ |

FIG.7

| ID | SENTENCE | SCORE |
|---|---|---|
| 00008 | 顔色が悪いですね | 0.089(17/190) |
| 00439 | 今日が初めてですか | 0.053(10/190) |
| 00001 | こんにちは | 0.048(0.053*0.9*390/390) |
| 00005 | 上着を脱いで下さい | 0.039(0.053*0.9*316/390) |
| 00006 | 大きく息を吸って下さい | 0.038(0.053*0.9*310/390) |
| 00007 | このベッドに寝て下さい | 0.035(0.17*0.9*290/390) |

| ID | SENTENCE | SCORE |
|---|---|---|
| 00009 | I have a headache. | 0.131(30/229) |
| 00010 | I have a stomachache. | 0.092(21/229) |
| 00921 | I feel dizzy. | 0.044(10/229) |
| 01219 | My arm seems broken. | 0.022(5/229) |
| 00086 | I think I caught a cold. | 0.017(4/220) |
| 02055 | The cough hangs on. | 0.009(2/229) |

| WORDS | SEMANTIC CATEGORY |
|---|---|
| 上着 | CLOTHES |
| 脱ぐ | SUBSUMPTION |
| ベッド | SHELF･TABLE |
| 頭 | HEAD･EYE AND NOSE･FACE |
| お腹 | HEAD･EYE AND NOSE･FACE |
| 注射 | MEDICAL TREATMENT |
| bed | SHELF･TABLE |
| have | POSSESSION･ACQUISITION |
| headache | CONDITION OF DISEASE |
| stomachache | CONDITION OF DISEASE |
| ~ | ~ |

FIG.16

| ID | SENTENCE | SEMANTIC CATEGORY |
|---|---|---|
| 00001 | こんにちは ～120 | GREETING (こんにちは) |
| 00002 | さようなら | GREETING (さようなら) |
| 00003 | ありがとうございます | GRATITUDE (ありがとう) |
| 00004 | どうしましたか | WHAT (どう) |
| 00005 | 上着を脱いで下さい ～173 | CLOTHES (上着), SUBSUMPTION (脱ぐ) |
| 00006 | 大きく息を吸って下さい | LARGE･WIDE (大きい), LIVING THING (息), MOTION OF MOUTH (吸う) |
| 00007 | このベッドに寝てください | SHELF･TABLE (ベッド), STAND･LIE (寝る) |
| 00008 | 顔色が悪いですね | EXPRESSION (顔色), GOOD･WRONG (悪い) |
| 00009 | 頭が痛いんです ～171 | HEAD･EYE AND NOSE･FACE (頭), CONSCIOUSNESS･SENSE (痛い) |
| 00010 | おなかが痛いんです | CHEST･ABDOMEN･BACK (お腹), CONSCIOUSNESS･SENSE (痛い) |
| 00011 | 注射して下さい | MEDICAL TREATMENT (注射) |
| 00012 | 目がちくちく痛みます ～172 | HEAD･EYE AND NOSE･FACE (目), CONSCIOUSNESS･SENSE (ちくちく), CONSCIOUSNESS･SENSE (痛い) |

| ID | SENTENCE | SEMANTIC CATEGORY |
|---|---|---|
| 00001 | Hello. ～220 | GREETING (hello) |
| 00002 | See you. | GREETING (see you) |
| 00003 | Thank you. | GRATITUDE (thank you) |
| 00004 | What's wrong with you? | WHAT (what), GOOD･WRONG (wrong) |
| 00005 | Put off your jacket. | CLOTHES (jacket), SUBSUMPTION (put off) |
| 00006 | Inhale deeply. | MOTION OF MOUTH (inhale), LARGE･WIDE (deeply) |
| 00007 | Lay yourself down on this bed. | SHELF･TABLE (bed), STAND･LIE (lay down) |
| 00008 | You look pale. | SEE (look), COLOR (pale) |
| 00009 | I have a headache. | POSSESSION･ACQUISITION (have), CONDITION OF DISEASE (headache) |
| 00010 | I have a stomachache. | POSSESSION･ACQUISITION (have), CONDITION OF DISEASE (stomachache) |
| 00011 | Give me an injection. | GIVE AND TAKE (give), CONDITION OF DISEASE (injection) |
| 00012 | I have a stabbing pain in my eye. | HEAD･EYE AND NOSE･FACE (eye), CONSCIOUSNESS･SENSE (pain), POSSESSION･ACQUISITION (have) |

261

TRANSLATION DEVICE AND COMPUTER PROGRAM PRODUCT

CROSS-REFERENCE TO RELATED APPLICATIONS

This application is a continuation of PCT international application Ser. No. PCT/JP2009/066677 filed on Sep. 25, 2009 which designates the United States; the entire contents of which are incorporated herein by reference.

FIELD

Embodiments described herein relate generally to a translation device and a computer program product.

BACKGROUND

In recent years, with the globalization of culture and economy, there is an increasing demand for a translation device that supports communication between people who have different mother tongues. For example, Japanese Patent No. 3962766 discloses a technique in which the conversation history of the user is stored in a database and the next utterance of the user is predicted and suggested with reference to the conversation history.

However, in the technique disclosed in Japanese Patent No. 3962766, the amount of data of the conversation history increases in proportion to the number of times the conversion support apparatus is used. Therefore, a high-capacity storage device is needed, which increases the costs.

BRIEF DESCRIPTION OF THE DRAWINGS

FIG. 4 is a diagram illustrating an example of an initial screen;

FIG. 5 is a diagram illustrating an example of parallel translations according to the first embodiment;

FIG. 6 is a diagram illustrating an example of a next utterance table;

FIG. 7 is a diagram illustrating an example of the candidates of the next utterance;

FIG. 16 is a diagram illustrating an example of parallel translations according to the second embodiment;

FIG. 17 is a diagram illustrating an example of the parallel translations according to the second embodiment.

DETAILED DESCRIPTION

According to an embodiment, a translation device includes a parallel translation storage unit, a translation unit, a next utterance table storage unit, an acquiring unit, a display unit, and selection receiving unit. The parallel translation storage unit is configured to store therein a plurality of parallel translations and their respective IDs so as to be associated with each other. Each of the parallel translations includes a sentence in a first language and a sentence in a second language having an equivalent semantic content so as to be associated with each other. The translation unit is configured to translate a first selected sentence in the first language into a sentence in the second language using the parallel translations. The next utterance table storage unit is configured to store therein a next utterance table in which first identification information and second identification information are associated with each other. The first identification information has the ID and distinguishes between the sentence in the first language and the sentence in the second language included in the parallel translation indicated by the ID. The second identification information identifies a sentence which has been previously selected as the next utterance of the sentence indicated by the first identification information from the parallel translation storage unit. The acquiring unit is configured to acquire, from the parallel translation storage unit, next utterance candidates, which are sentences indicated by the second identification information which is associated with the first identification information of the first selected sentence, with reference to the next utterance table. The display unit is configured to display the first selected sentence, a translation result of the first selected sentence, and the next utterance candidates. The selection receiving unit is configured to receive a selection of the next utterance candidate. If the selected next utterance candidate is the first language, the translation unit translates the selected next utterance candidate into the second language using the parallel translations, if the selected next utterance candidate is the second language, the translation unit translates the selected next utterance candidate into the first language using the parallel translations.

Hereinafter, a translation device and a program according to exemplary embodiments will be described in detail with reference to the accompanying drawings. In the following embodiments, an example in which Japanese is used as a first language and English is used as a second language will be described, but the translation form is not limited thereto. The translation between all languages is applicable.

First Embodiment

Figure 1:
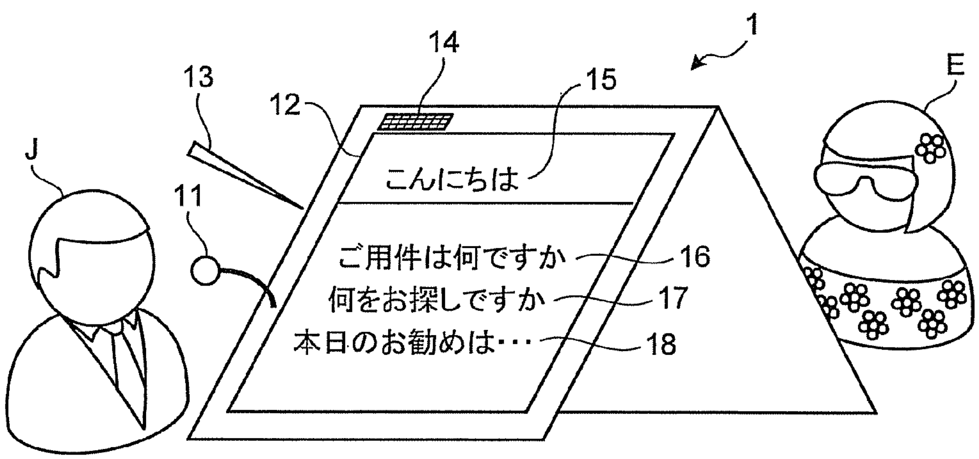
FIG. 1 is a diagram illustrating the outline of a translation device according to a first embodiment.
Figure 2:
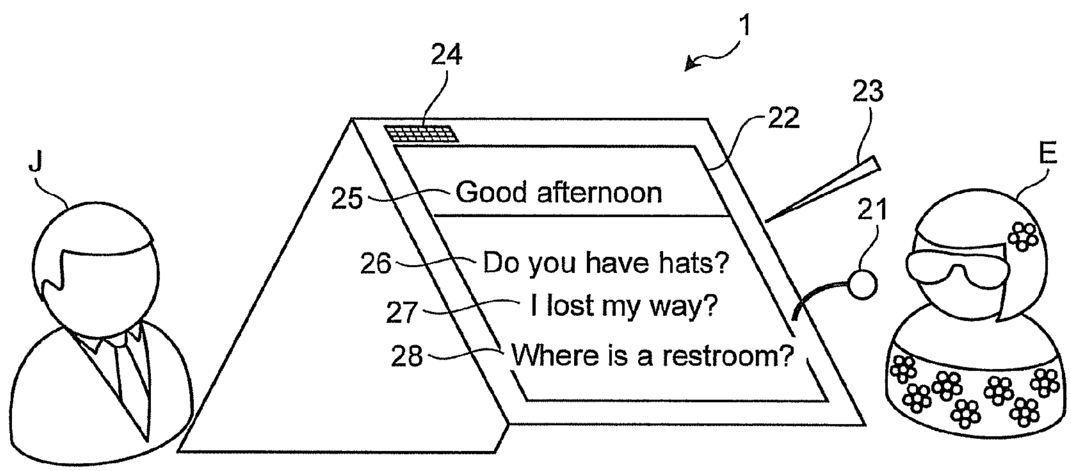
FIG. 2 is a diagram illustrating the outline of the translation device according to the first embodiment.

First, the outline of a translation device according to a first embodiment will be described with reference to FIGS. 1 and 2. FIGS. 1 and 2 illustrate an example in which a user J whose mother tongue is Japanese and a user E whose mother tongue is English communicate with each other using a translation device 1. Specifically, FIGS. 1 and 2 illustrate a state after the user J whose mother tongue is Japanese inputs a speech using a microphone 11 and the speech recognition result thereof is selected as the next utterance.

A Japanese sentence 15, which is the recognition result of the speech input from the microphone 11 and is selected as the next utterance by a touch pen 13, is displayed on a display 12.

Japanese sentences 16 to 18, which are the candidates of the next utterance of the Japanese sentence 15, are also displayed on the display 12. Then, the user J selects any one of the Japanese sentences 16 to 18 displayed on the display 12 using the touch pen 13 or inputs a new speech using the microphone 11, thereby making the next utterance. When the user E makes the subsequent utterance, the translation result is output as a speech from a speaker 14.

An English sentence 25 which is the translation result of the Japanese sentence 15 as well as English sentences 26 to 28 which are the candidates of the next utterance of the Japanese sentence 15 are displayed on a display 22. The translation result of the Japanese sentence 15 is also output as a speech from a speaker 24. Then, the user E selects any one of the English sentences 26 to 28 displayed on the display 22 using a touch pen 23 or inputs a new speech using a microphone 21, thereby making the next utterance.

Next, the structure of the translation device according to the first embodiment will be described.

Figure 3:
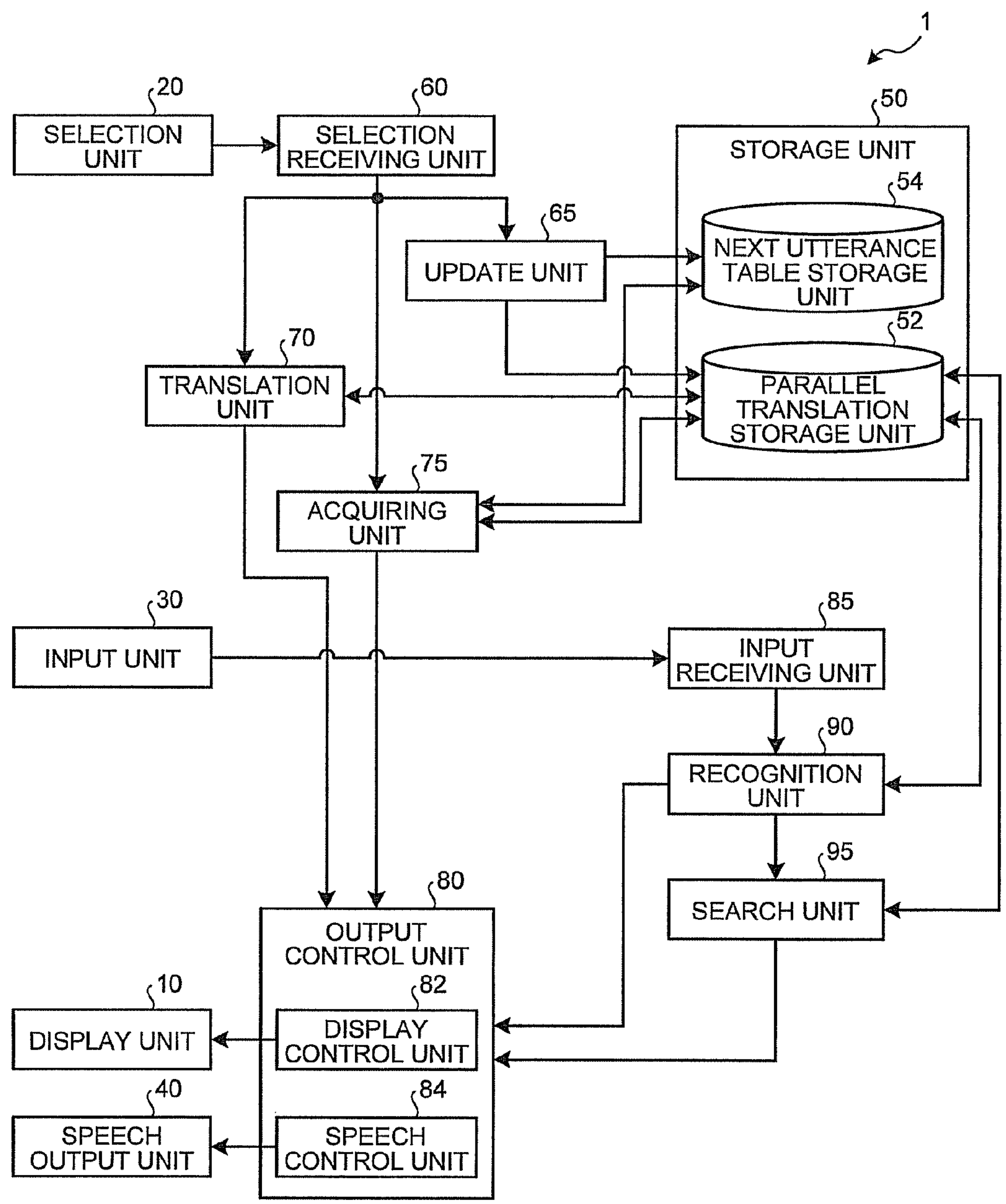
FIG. 3 is a block diagram illustrating the translation device according to the first embodiment.

FIG. 3 is a block diagram illustrating an example of the structure of the translation device 1 according to the first embodiment. As shown in FIG. 3, the translation device 1 includes a display unit 10, a selection unit 20, an input unit 30, a speech output unit 40, a storage unit 50, a selection receiving unit 60, an update unit 65, a translation unit 70, an acquiring unit 75, an output control unit 80, an input receiving unit 85, a recognition unit 90, and a search unit 95.

The display unit 10 displays, for example, the translation result, the candidates of the next utterance, and the speech recognition result in response to instructions from the output control unit 80, which will be described below, and may be the existing display device, such as a touch panel display, a liquid crystal display, or an organic EL display. In addition, when the translation device 1 starts, the display unit 10 displays an initial screen.

FIG. 4 is a diagram illustrating an example of the initial screen. In the example shown in FIG. 4, Japanese greeting words which are likely to be uttered first by the user J are displayed as candidates in a candidate display area 110 of a Japanese display screen 100. Similarly, English greeting words which are likely to be uttered first by the user E are displayed as candidates in a candidate display area 210 of an English display screen 200. The Japanese display screen 100 is displayed on the display 12 shown in FIG. 1 and the English display screen 200 is displayed on the display 22 shown in FIG. 2.

Returning to FIG. 3, the selection unit 20 detects selection operation by the user J or the user E for the next utterance from the candidates displayed on the display unit 10 and may be the existing input device, such as a touch panel display or a pointing device. The display unit 10 and the selection unit 20 may be integrated into, for example, a touch panel display.

The input unit 30 receives, for example, the speech spoken by the user J or the user E and may be the existing speech input device, such as a microphone.

The speech output unit 40 outputs, for example, the translation result as a speech in response to instructions from the output control unit 80, which will be described below, and may be the existing speech output device, such as a speaker.

The storage unit 50 stores therein, for example, various kinds of programs executed by the translation device 1 and information used in various kinds of processes which are performed by the translation device 1. The storage unit 50 may be the existing storage device capable of magnetically, optically, or electrically storing data, such as an Hard Disk Drive (HDD), an Solid State Drive (SSD), a memory card, an optical disk, a Read Only Memory (ROM), or a Random Access Memory (RAM). The storage unit 50 includes a parallel translation storage unit 52 and a next utterance table storage unit 54.

The parallel translation storage unit 52 stores therein a plurality of parallel translations in which Japanese sentences and English sentences having the equivalent semantic content are associated with each other, and stores therein IDs of the respective parallel translations so as to be associated with each other. FIG. 5 is a diagram illustrating an example of the parallel translations stored in the parallel translation storage unit 52. In the example shown in FIG. 5, the parallel translation storage unit 52 stores therein IDs for specifying parallel translations, Japanese sentences forming the parallel translations, the frequency of use of the Japanese sentences, English sentences forming the parallel translations, and the frequency of use of the English sentences, so as to be associated with each other. For example, a parallel translation with an ID 00001 indicates that the Japanese sentence is a Japanese sentence 120, the frequency of use of the Japanese sentence 120 is 390, the English sentence is an English sentence 220, and the frequency of use of the English sentence 220 is 238. Similarly, a parallel translation with an ID 00009 indicates that the Japanese sentence is a Japanese sentence 121, the frequency of use of the Japanese sentence 121 is 0, the English sentence is an English sentence 221, and the frequency of use of the English sentence 221 is 115.

Returning to FIG. 3, the next utterance table storage unit 54 stores therein a next utterance table in which first identification information that specifies an ID and distinguishes between the sentence in the first language and the sentence in the second language forming the parallel translation indicated by the ID is associated with second identification information that identifies the sentence which has been previously selected from the parallel translation storage unit 52 as the next utterance of the sentence indicated by the first identification information.

FIG. 6 is a diagram illustrating an example of the next utterance table stored in the next utterance table storage unit 54. In the example shown in FIG. 6, the next utterance table storage unit 54 stores therein the next utterance table in which the first identification information, the second identification information, and frequency information are associated with each other. The frequency information indicates the number of times the sentence indicated by the second identification information is selected as the next utterance of the sentence indicated by the first identification information and includes the frequency of selection and a total frequency. The frequency of selection indicates the number of times the sentence indicated by the second identification information is selected as the next utterance of the sentence indicated by the first identification information and the total frequency indicates the number of times the sentence in the same language as that used in the sentence indicated by the second identification information is selected as the next utterance of the sentence indicated by the first identification information. The first identification information includes ID 1 specifying a parallel translation stored in the parallel translation storage unit 52 and language type 1 indicating the language of the parallel translation, and the second identification information includes ID 2 specifying a parallel translation stored in the parallel translation storage unit 52 and language type 2 indicating the language of the parallel translation.

For example, in the parallel translation table shown in FIG. 6, an entry 130 in the first row indicates that the ID 1 is 00001, the language type 1 is J, the ID 2 is 00001, the language type 2 is E, the frequency of selection is 49, and the total frequency is 255. As shown in FIG. 5, the Japanese sentence with a parallel translation ID 00001 is the Japanese sentence 120 and the English sentence with a parallel translation ID 00001 is the English sentence 220. Therefore, the entry 130 indicates that the number of times the English sentence 220 was selected as the next utterance of the Japanese sentence 120 is 49 and the number of times a given English sentence was selected as the next utterance of the Japanese sentence 120 is 255.

In the parallel translation table shown in FIG. 6, an entry 131 in the sixth row indicates that the ID 1 is 00004, the language type 1 is J, the ID 2 is 00009, the language type 2 is E, the frequency of selection is 30, and the total frequency is 229. As shown in FIG. 5, the Japanese sentence with a parallel translation ID 00004 is a Japanese sentence 112 and the English sentence with a parallel translation ID 00009 is the English sentence 221. Therefore, the entry 131 indicates that the number of times the English sentence 221 was selected as the next utterance of the Japanese sentence 112 is 30 and the number of times an English sentence was selected as the next utterance of the Japanese sentence 112 is 229.

Returning to FIG. 3, the selection receiving unit 60 receives selection from the selection unit 20. For example, in FIG. 4, when the selection unit 20 detects user J's selection of the Japanese sentence 112 as the next utterance, the selection receiving unit 60 receives the selection of the Japanese sentence 112.

The update unit 65 updates the frequency information associated with the first identification information of the previously selected sentence and the second identification information of the currently selected sentence with reference to the next utterance table. Specifically, the update unit 65 increases the frequency of selection and the total frequency in the frequency information associated with the first identification information of the previously selected sentence and the second identification information of the currently selected sentence. In addition, the update unit 65 increases the total frequency in the frequency information associated with the first identification information of the previously selected sentence and the second identification information of the sentence in the same language as that used in the currently selected sentence. The update unit 65 increases the frequency of use of the currently selected sentence with reference to the parallel translations stored in the parallel translation storage unit 52.

For example, in FIG. 4, when the selection unit 20 detects user J's selection of the Japanese sentence 112 as the next utterance, the update unit 65 increases the frequency of use of the currently selected Japanese sentence 112 with reference to the parallel translations shown in FIG. 5. In FIG. 4, since there is no previously selected sentence, the update unit 65 does not update the frequency of selection and the total frequency in the next utterance table shown in FIG. 6.

The translation unit 70 translates the selected sentence received by the selection receiving unit 60 using the parallel translations stored in the parallel translation storage unit 52. Specifically, when the selection receiving unit 60 receives the selection of a Japanese sentence, the translation unit 70 translates the Japanese sentence into an English sentence. When the selection receiving unit 60 receives the selection of an English sentence, the translation unit 70 translates the English sentence into a Japanese sentence. When there is no sentence equivalent to the recognition result of the speech by the recognition unit 90, which will be described below, in the parallel translations, the translation unit 70 performs machine translation for the recognition result.

The acquiring unit 75 acquires Japanese and English sentences indicated by a plurality of pieces of second identification information being associated with the first identification information of the selected sentence received by the selection receiving unit 60 from the parallel translation storage unit 52 with reference to the next utterance table stored in the next utterance table storage unit 54. Specifically, the acquiring unit 75 acquires, from the parallel translation storage unit 52, within a predetermined number range, Japanese sentences indicated by a plurality of pieces of second identification information being associated with the first identification information of the selected sentence received by the selection receiving unit 60 in descending order of the frequency of use indicated by the frequency information, with reference to the next utterance table. Similarly, the acquiring unit 75 acquires, from the parallel translation storage unit 52, within a predetermined number range, English sentences indicated by a plurality of pieces of second identification information being associated with the first identification information of the selected sentence received by the selection receiving unit 60 in descending order of the frequency of use indicated by the frequency information, with reference to the next utterance table.

For example, in FIG. 4, when the selection receiving unit 60 receives the selection of the Japanese sentence 112, the acquiring unit 75 calculates, using the following Expression 1, the score of an entry in which language type 2 is J among the pieces of second identification information associated with the first identification information indicating the Japanese sentence 112 with reference to the next utterance table. Then, the acquiring unit 75 acquires, from the parallel translation storage unit 52, with in a predetermined number range, sentences indicated by the pieces of second identification information in descending order of the calculated score (frequency). In this case, the acquiring unit 75 calculates the score of an entry 133 in which the ID 1 is 00004, the language type 1 is J, the ID 2 is 00008, and the language type 2 is J and the score of an entry 134 in which the ID 1 is 00004, the language type 1 is J, the ID 2 is 00439, and the language type 2 is J. Then, the acquiring unit 75 sequentially acquires a Japanese sentence with an ID 00008 and a Japanese sentence with an ID 00439 from the parallel translation storage unit 52 and adds the acquired Japanese sentences to the candidates of the next utterance of the Japanese sentence. In FIG. 4, when the selection receiving unit 60 receives the selection of the Japanese sentence 112, the acquiring unit 75 performs the same process as described above on an entry in which the language type 2 is E among the pieces of second identification information associated with the first identification information indicating the Japanese sentence 112 and adds the acquired sentences to the candidates of the next utterance of the English sentence.

$$\text{Score}((s_i, l_i) \mid (s_j, l_j)) = \frac{Freq((s_i, l_i), (s_j, l_j))}{Freq((s_j, l_j))} \quad (1)$$

$(s_i, l_i)$ indicates the ID 2 and the language type 2, $(s_j, l_j)$ indicates the ID 1 and the language type 1, $\text{Freq}((s_j, l_j))$ indicates the total frequency, and $\text{Freq}((s_i, l_i), (s_j, l_j))$ indicates the frequency of the selection. That is, Expression 1 calculates the ratio of the frequency of the selection to the total frequency.

When the number of acquired Japanese sentences is less than the predetermined number, the acquiring unit 75 calculates the scores of the Japanese sentences of the parallel translations stored in the parallel translation storage unit 52 using the following Expression 2 and acquires, within a predetermined number range, Japanese sentences indicated by the pieces of second identification information from the parallel translation storage unit 52 in descending order of the calculated scores. However, the acquiring unit 75 does not acquire the sentences indicated by the already-acquired pieces of second identification information. The acquiring unit 75 sequentially acquires a Japanese sentence with an ID 00001, a Japanese sentence with an ID 00005, a Japanese sentence with an ID 00006, and a Japanese sentence with an ID 00007 from the parallel translation storage unit 52 and adds the acquired Japanese sentences to the candidates. When the number of acquired English sentences is less than a predetermined number, the acquiring unit 75 performs the same process as described above and adds the acquired English sentences to the candidates that are the candidates of the next utterance of the English sentence.

$$\text{Score}((s_i, l_i)) = Sm * b * \frac{Freq((s_i, l_i))}{\max(Freq((s_j, l_j)))} \quad (2)$$

Sm is the minimum value of the score calculated by Expression 1 (however, when there is no target entry and the score is not calculated by Expression 1, Sm is 1), b is a coefficient, $\max(\text{Freq}((s_i, l_i)))$ indicates the maximum value of the frequency of use, and $\text{Freq}((s_i, l_i))$ indicates the frequency of use. It is preferable that the value of the coefficient b be less than 1 (for example, 0) so as not to be more than the minimum value of the score calculated by Expression 1.

When the candidates of the next utterance are acquired in this way, it is possible to add the sentence with a high frequency of use to the candidates of the next utterance, without any inconsistency in the sentence obtained from the next utterance table.

FIG. 7 is a diagram illustrating an example of the candidates of the next utterance of the Japanese sentence acquired by the acquiring unit 75. In the example shown in FIG. 7, Japanese Sentences are added to the candidates in descending order of the score. For example, a Japanese sentence with an ID 00008, a Japanese sentence with an ID 00439, a Japanese sentence with an ID 00001, a Japanese sentence with an ID 00005, a Japanese sentence with an ID 00006, a Japanese sentence with an ID 00007 are sequentially added to the candidates. In the example shown in FIG. 7, the scores of the Japanese sentence with the ID 00001 and the Japanese sentence with the ID 00005 are calculated by Expression 1 and the scores of the other Japanese sentences are calculated by Expression 2.

Figures 8, 9:
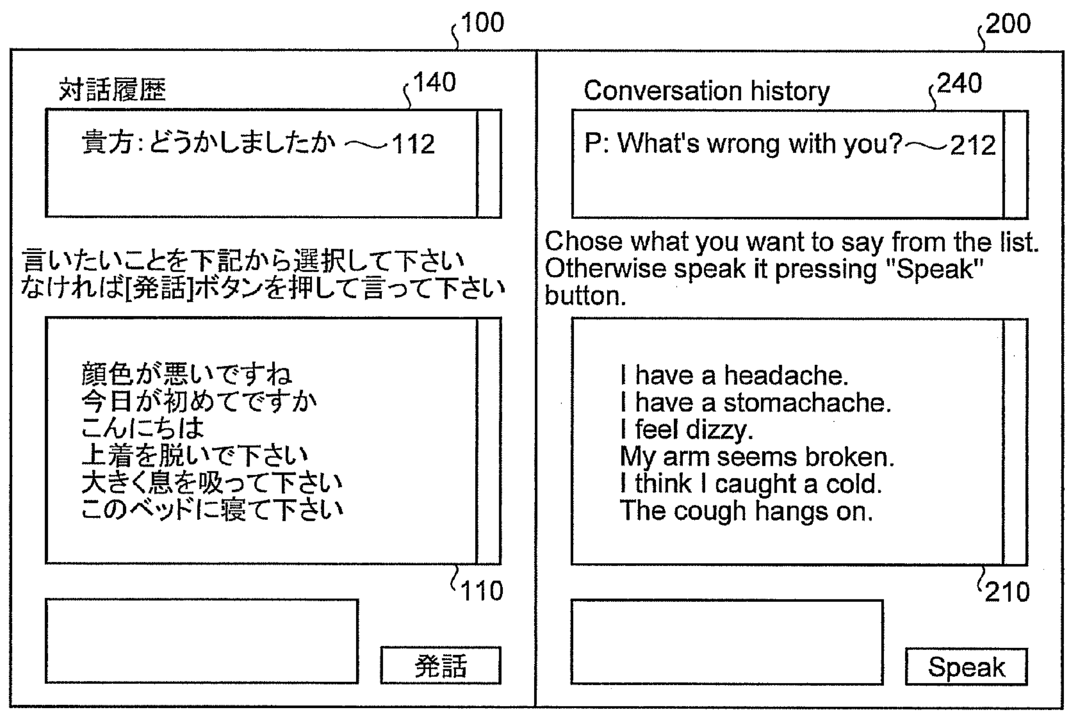
FIG. 8 is a diagram illustrating an example of the candidates of the next utterance.
FIG. 9 is a diagram illustrating an example of the display of the candidates of the next utterance on a screen.

FIG. 8 is a diagram illustrating an example of the candidates of the next utterance of the English sentence acquired by the acquiring unit 75. In the example shown in FIG. 8, English Sentences are added to the candidates in descending order of the score. For example, an English sentence with an ID 00009, an English sentence with an ID 00010, an English sentence with an ID 00921, an English sentence with an ID 01219, an English sentence with an ID 00086, and an English sentence with an ID 02055 are sequentially added to the candidates. In the example shown in FIG. 8, the scores of all of the English sentences are calculated by Expression 1.

Returning to FIG. 3, the output control unit 80 performs display control on the display unit 10, performs speech control on the speech output unit 40, and includes a display control unit 82 and a speech control unit 84. The output control unit 80 may switch between the following display output and speech output, if needed, or it may perform both the display output and the speech output.

The display control unit 82 displays the selected sentence received by the selection receiving unit 60 and the translation result of the selected sentence received by the selection receiving unit 60 on the display unit 10. In addition, the display control unit 82 displays the Japanese sentence acquired by the acquiring unit 75 as the candidate of the next Japanese utterance on the display unit 10 and displays the English sentence acquired by the acquiring unit 75 as the candidate of the next English utterance on the display unit 10. The display control unit 82 also displays the recognition result of the recognition unit 90, which will be described below, on the display unit 10. This will be described in detail below.

FIG. 9 is a diagram illustrating an example of a screen on which the sentences acquired by the acquiring unit 75 are displayed as the candidates of the next utterance. In the example shown in FIG. 9, the Japanese sentence 112 is displayed in a conversation history display area 140 of the Japanese display screen 100 and the Japanese sentences shown in FIG. 7 are displayed as the candidates of the next Japanese utterances in the candidate display area 110. Similarly, an English sentence 212, which is the translation result of the Japanese sentence 112, is displayed in a conversation history display area 240 of the English display screen 200 and the English sentences shown in FIG. 8 are displayed as the candidates of the next English utterances in the candidate display area 210.

Returning to FIG. 3, the speech control unit 84 causes the speech output unit 40 to output, for example, the translation result of the selected sentence received by the selection receiving unit 60. Specifically, the speech control unit 84 performs a speech synthesis process of converting the translation result into speech signals, converts the speech signals generated by the speech synthesis process by D/A conversion, and causes the speech output unit 40 to output the speech.

The input receiving unit 85 receives the input of a Japanese or English speech from the input unit 30. Specifically, the input receiving unit 85 performs sampling on the analog signal of the speech input from the input unit 30 and converts the analog signal into a digital stereo signal. The existing technique, such as A/D conversion, may be used to convert the analog signal into the digital signal.

The recognition unit 90 recognizes the speech received by the input receiving unit 85 and generates a character string of the recognized speech. For example, when a Japanese speech is received by the input receiving unit 85, the recognition unit 90 recognizes the speech and generates a Japanese character string. When an English speech is received by the input receiving unit 85, the recognition unit 90 recognizes the speech and generates an English character string. Specifically, the recognition unit 90 extracts a feature indicating acoustic features for determining phonemes of the speech from the digital signal converted by the input receiving unit 85 in time series. The recognition unit 90 generates a probable character string or word string for the speech received by the input receiving unit 85 on the basis of the time series of the extracted features.

As a method of extracting the feature, the existing method based on Fast Fourier Transform (FFT), such as frequency spectrum analysis, linear prediction analysis, or cepstrum analysis, may be used. In such methods, a short time section of a continuous speech waveform is cut out to extract the feature in the time section to be analyzed and sequentially shifts the time section to be analyzed to extract the features in time series. For example, the method disclosed in "Kiyohiro Shikano, et al., "Speech Recognition System", Ohmu Publishing Co., 2001" may be used to extract the feature and generate the character string or the word string.

The search unit 95 searches for sentences similar to the sentence recognized by the recognition unit 90 from the parallel translation storage unit 52. Specifically, when the input receiving unit 85 receives a Japanese speech, the search unit 95 searches the parallel translation storage unit 52 for Japanese sentences similar to the Japanese character string generated by the recognition unit 90. When the input receiving unit 85 receives an English speech, the search unit 95 searches the parallel translation storage unit for English sentences similar to the English character string generated by the recognition unit 90. For example, the search unit 95 calculates the similarity between the sentences using a Dice coefficient represented by the following Expression 3, a Jaccard coefficient represented by Expression 4, or a cosine coefficient represented by Expression 5.

$$\sigma(s_x, s_y) = \frac{2\sum_{i=1}^{T} x_i * y_i}{\sum_{i=1}^{T} x_i^2 + \sum_{i=1}^{T} y_i^2} \quad (3)$$

$$\sigma(s_x, s_y) = \frac{\sum_{i=1}^{T} x_i * y_i}{\sum_{i=1}^{T} x_i^2 + \sum_{i=1}^{T} y_i^2 - \sum_{i=1}^{T} x_i * y_i} \quad (4)$$

$$\sigma(s_x, s_y) = \frac{\sum_{i=1}^{T} x_i * y_i}{\sqrt{\sum_{i=1}^{T} x_i^2 * \sum_{i=1}^{T} y_i^2}} \quad (5)$$

In Expressions 3 to 5, $\sigma(s_x, s_y)$ indicates the similarity between a sentence $s_x$ and a sentence $s_y$, and $x_i$ and $y_i$ indicate the presence or absence of a word in the sentence $s_x$ and the sentence $s_y$, respectively. With respect to the first to T-th words in the sentence $s_x$ or the sentence $s_y$: when there is an i-th word in the sentence $s_x$, $x_i$ is set to 1; when the i-th word is not in the sentence $s_x$, $x_i$ is set to 0; when there is an i-th word in the sentence $s_y$, $y_i$ is set to 1; and when the i-th word is not in the sentence $s_y$, $y_i$ is set to 0. It is preferable that a content word may be used for the similarity calculation by excluding a function word such as a particle or an auxiliary verb in the Japanese word and such as an article or a preposition in the English word.

Expressions 3 to 5 are defined such that, as the larger the number of same words included in the sentences to be compared with each other is, the higher the similarity σ is. The expressions do not consider a difference in meaning or in part of speech between words. However, the similarity between the sentences may be calculated considering that difference.

Next, a display method of the recognition result by the display control unit 82 will be described. The display control unit 82 displays the sentence recognized by the recognition unit 90 and similar sentences searched by the search unit 95 as the candidates of the next utterance on the display unit 10. Specifically, when the input receiving unit 85 receives a Japanese speech, the display control unit 82 displays the Japanese character string generated by the recognition unit 90 and the Japanese sentences searched by the search unit 95 as the candidates of the next Japanese utterance on the display unit 10. Similarly, when the input receiving unit 85 receives an English speech, the display control unit 82 displays the English character string generated by the recognition unit 90 and the English sentences searched by the search unit 95 as the candidates of the next English utterance on the display unit 10.

Figure 10:
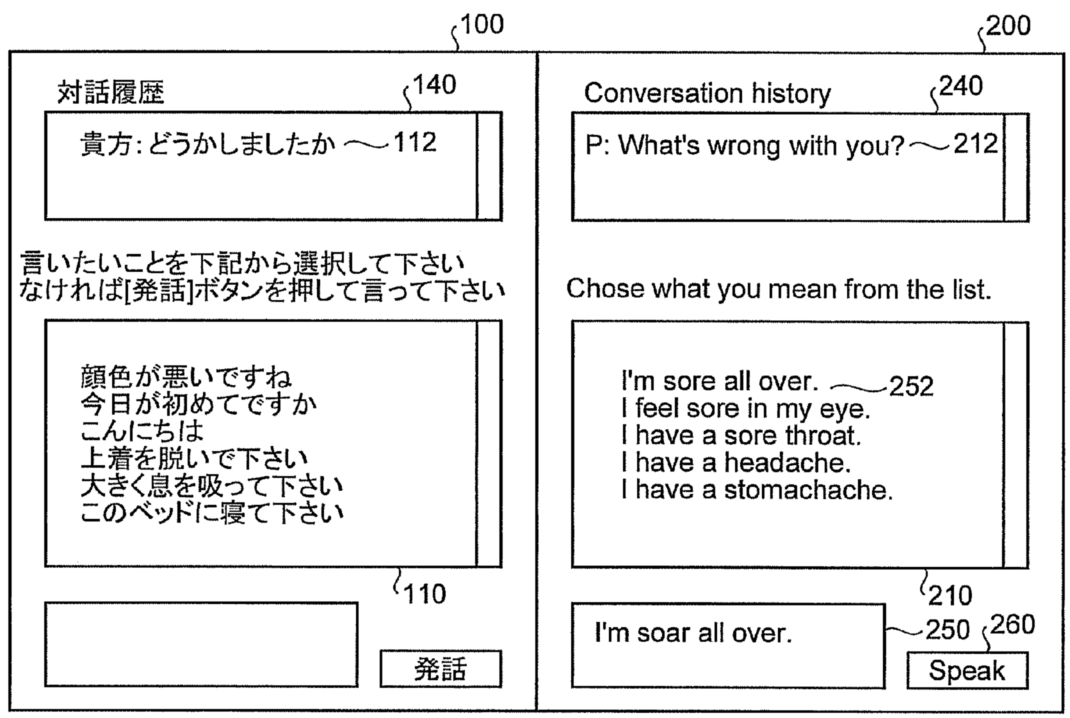
FIG. 10 is a diagram illustrating an example of the display of the candidates of the next utterance on the screen.

FIG. 10 is a diagram illustrating an example of a screen on which the sentences searched by the search unit 95 are displayed as the candidates of the next utterance. Specifically, FIG. 10 illustrates a state after the user E presses a "Speak" button 260 and inputs an English speech in the state shown in FIG. 9. In the example shown in FIG. 10, the recognition result of the speech input by the user E is displayed in a recognition result display area 250 of the English display screen 200, and an English sentence 252, which is the recognition result of the speech, and a plurality of English sentences similar to the English sentence 252 searched by the search unit 95 are displayed as the candidates of the next English utterance in the candidate display area 210.

Next, the operation of the translation device according to the first embodiment will be described.

Figure 11:
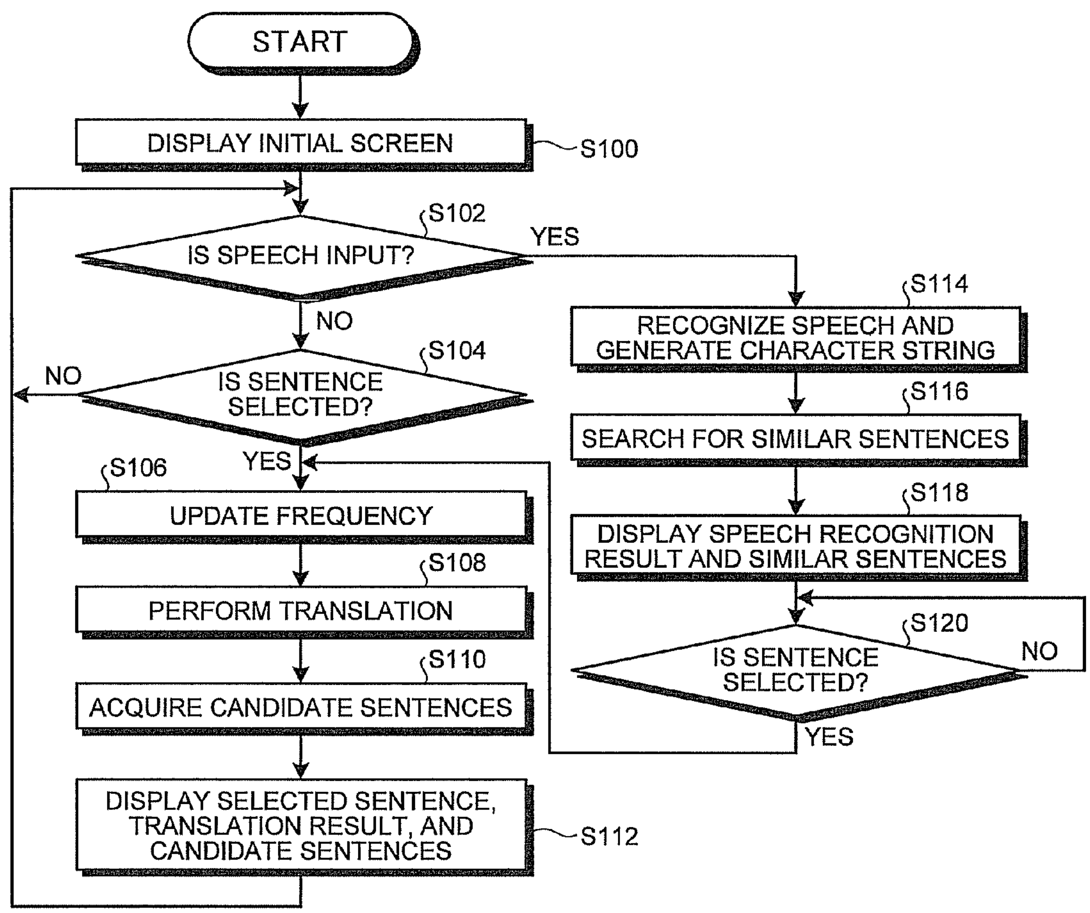
FIG. 11 is a flowchart illustrating an example of the process of the translation device according to the first embodiment.

FIG. 11 is a flowchart illustrating an example of the flow of the process performed by the translation device 1 according to the first embodiment.

First, the display control unit 82 displays the initial screen on the display unit 10 (Step S100). The display control unit 82 displays, for example, the initial screen shown in FIG. 4 on the display unit 10.

Then, the input receiving unit 85 checks whether a speech is input from the input unit 30 (Step S102).

When no speech is input (No in Step S102), the selection receiving unit 60 checks whether the next utterance is selected from the candidates displayed on the display unit 10 (Step S104). For example, when the Japanese sentence 112 is selected as the next utterance in FIG. 4, the selection receiving unit 60 confirms the selection of the Japanese sentence 112. When the next utterance is not selected (No in Step S104), the process returns to Step S102.

When the next utterance is selected (Yes in Step S104), the update unit 65 updates the frequency information in which the first identification information of the previously selected sentence is associated with the second identification information of the currently selected sentence, with reference to the next utterance table (Step S106).

Then, the translation unit 70 translates the selected sentence received by the selection receiving unit 60 using the parallel translations stored in the parallel translation storage unit 52 (Step S108). For example, the translation unit 70 translates the Japanese sentence 112 into the English sentence 212.

Then, the acquiring unit 75 acquires, from the parallel translation storage unit 52, Japanese and English sentences indicated by a plurality of pieces of second identification information which are associated with the first identification information of the selected sentence received by the selection receiving unit 60 with reference to the next utterance table (Step S110). The next utterance candidate acquiring process of the acquiring unit 75 will be described in detail below.

Then, the display control unit 82 displays the selected sentence received by the selection receiving unit 60, the translation result of the selected sentence received by the selection receiving unit 60, the candidates of the next utterance of the Japanese sentence, and the candidates of the next utterance of the English sentence on the display unit 10 (Step S112). For example, the display control unit 82 displays the screen shown in FIG. 9 on the display unit 10. When Step S112 ends, the process returns to Step S102.

On the other hand, when a speech is input in Step S102 (Yes in Step S102), the recognition unit 90 recognizes the speech received by the input receiving unit 85 and generates a character string of the recognized speech (Step S114).

Then, the search unit 95 searches for sentences similar to the sentence recognized by the recognition unit 90 from the parallel translation storage unit 52 (Step S116).

Then, the display control unit 82 displays the recognition result of the recognition unit 90 and the similar sentences searched by the search unit 95 on the display unit 10 (Step S118). For example, the display control unit 82 displays the screen shown in FIG. 10 on the display unit 10.

Then, the selection receiving unit 60 waits for the selection of the next utterance from the candidates displayed on the display unit 10 (No in Step S120). When the selection is confirmed (Yes in Step S120), the process proceeds to Step S106.

Figure 12:
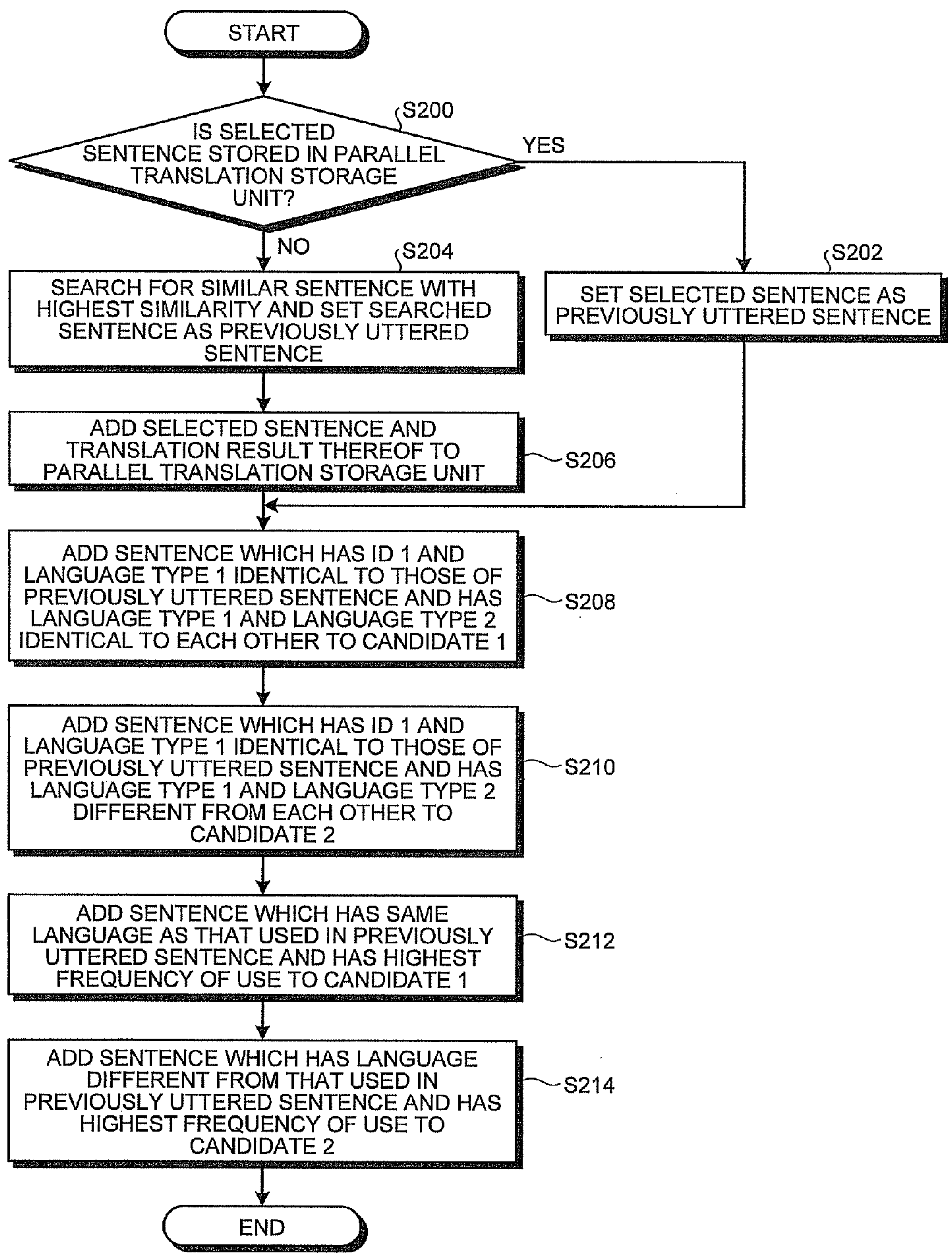
FIG. 12 is a flowchart illustrating an example of a next utterance candidate acquiring process of the translation device according to the first embodiment.

FIG. 12 is a flowchart illustrating an example of the flow of the next utterance candidate acquiring process performed by the translation device 1 according to the first embodiment.

First, the acquiring unit 75 checks whether the sentence selected by the selection receiving unit 60 is stored in the parallel translation storage unit 52 (Step S200).

When the selected sentence is stored in the parallel translation storage unit 52 (Yes in Step S200), the acquiring unit 75 sets the selected sentence as the previously uttered sentence (Step S202).

On the other hand, when the selected sentence is not stored in the parallel translation storage unit 52 (No in Step S200), the search unit 95 searches the parallel translation storage unit for a sentence with the highest similarity to the selected sentence and sets the searched sentence as the previously uttered sentence (Step S204).

Then, the acquiring unit 75 adds, as parallel translations in the parallel translation storage unit 52, the sentence selected by the selection receiving unit 60 and the translation result of the sentence selected by the selection receiving unit 60 so as to be associated with each other (Step S206).

Then, the acquiring unit 75 acquires the sentences in the same language as that used in the previously uttered sentences respectively indicated by a plurality of pieces of second identification information which are associated with the first identification information of the previously uttered sentence, with reference to the next utterance table. That is, the acquiring unit 75 acquires, from the parallel translation storage unit 52, within a predetermined number range, sentences with ID 2 which have ID 1 and language type 1 identical to those of the previously uttered sentence and have language type 1 and language type 2 identical to each other in descending order of the frequency of use and adds the acquired sentence to candidate 1 (Step S208).

Then, the acquiring unit 75 acquires the sentences in a language different from that used in the previously uttered sentences respectively indicated by a plurality of pieces of second identification information which are associated with the first identification information of the previously uttered sentence, with reference to the next utterance table. That is, the acquiring unit 75 acquires, from the parallel translation storage unit 52, within a predetermined number range, sentences with ID 2 which have ID 1 and language type 1 identical to those of the previously uttered sentence and have language type 1 and language type 2 which are different from each other in descending order of the frequency of use and adds the acquired sentences to candidate 2 (Step S210).

Then, when the number of sentences added to the candidate 1 is less than a predetermined number, the acquiring unit 75 acquires, from the parallel translation storage unit 52, the sentences in the same language as that used in the previously uttered sentence in descending order of the frequency of use until the number of acquired sentences reaches the predetermined number range and adds the acquired sentences to the candidate 1 (Step S212).

Then, when the number of sentences added to the candidate 2 is less than a predetermined number, the acquiring unit 75 acquires, from the parallel translation storage unit 52, the sentences in the language different from that used in the previously uttered sentence in descending order of the frequency of use until the number of acquired sentences reaches the predetermined number range and adds the sentences to the candidate 2 (Step S214).

As described above, in the first embodiment, the candidates of the next utterance are acquired using the next utterance table in which the first identification information for identifying each of a plurality of sentences in the first and second languages forming the parallel translations is associated with the second identification information for identifying the sentence which has been previously selected as the next utterance of the sentence indicated by the first identification information from the parallel translations. Therefore, according to the first embodiment, even when the translation device 1 is repeatedly used, the amount of data of the conversation history does not increase. As a result, it is possible to predict the next utterance of the user at a low cost.

In particular, in the first embodiment, as the next utterance of the sentence indicated by the first identification information, the candidates of the next utterance is acquired in descending order of the number of times the sentence indicated by the second identification information is selected. Therefore, it is possible to preferentially display the next utterance which is more likely to be selected by the user.

Second Embodiment

In a second embodiment, an example of searching for similar sentences using a semantic category dictionary will be described. The difference from the first embodiment will be mainly described below. In the following description, components having the same functions as those in the first embodiment have the same names and reference numerals and a description thereof will not be repeated.

Figure 13:
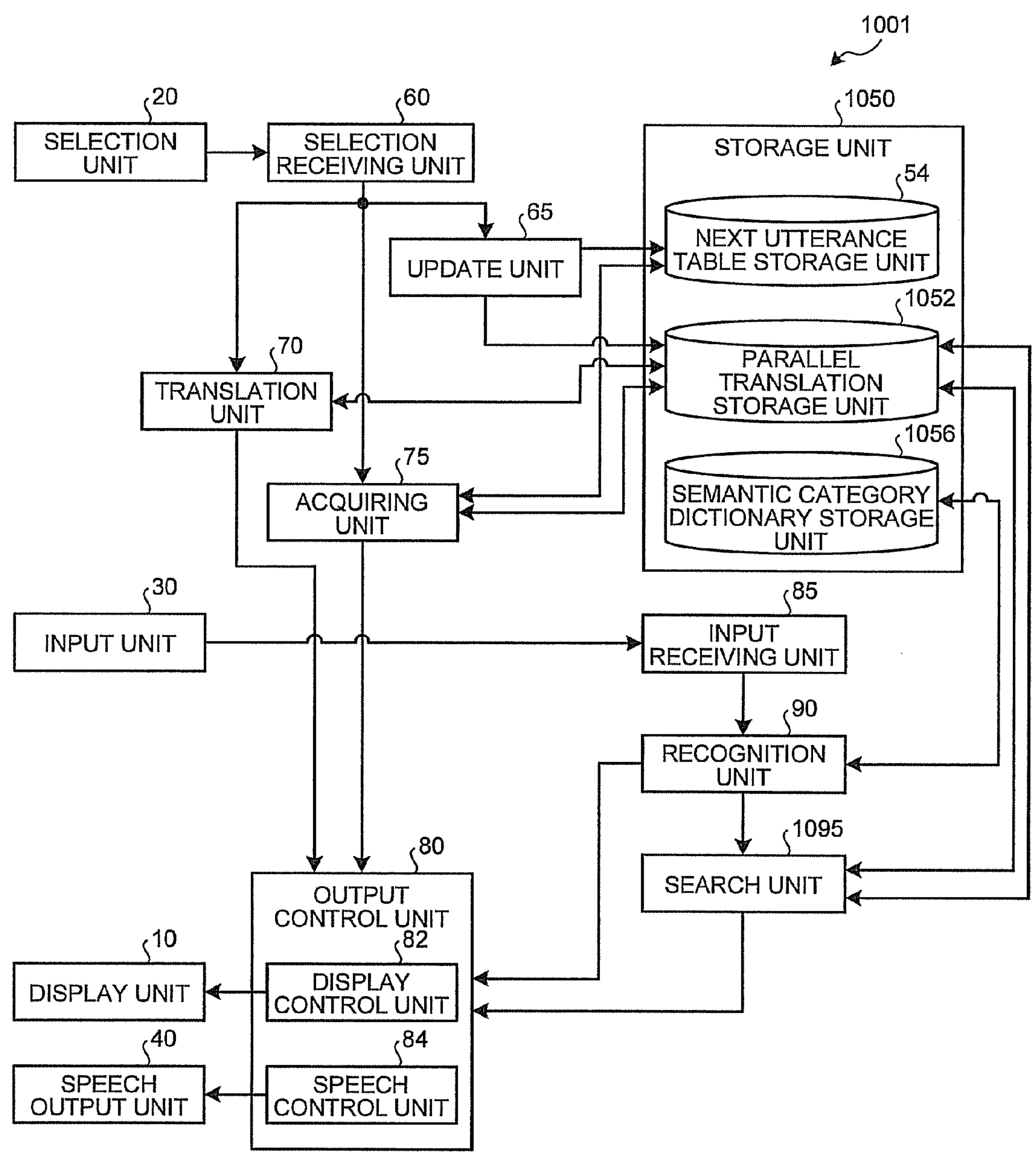
FIG. 13 is a block diagram illustrating a translation device according to a second embodiment.

FIG. 13 is a block diagram illustrating an example of the structure of a translation device 1001 according to the second embodiment. The translation device 1001 shown in FIG. 13 differs from the translation device 1 according to the first embodiment in that a semantic category dictionary storage unit 1056 is provided in a storage unit 1050 and in the content of the process of a search unit 1095 and parallel translations stored in a parallel translation storage unit 1052.

Figures 14, 15:
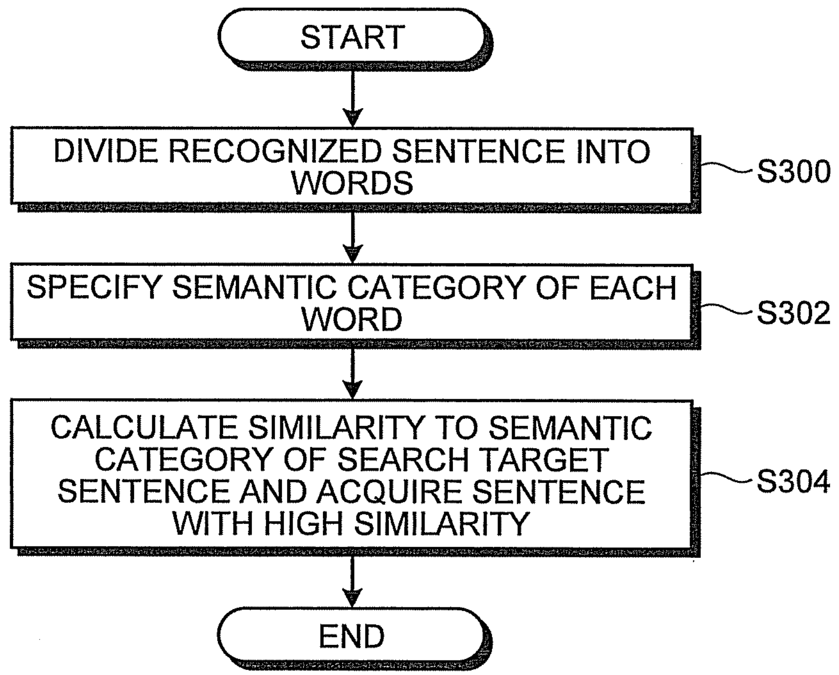
FIG. 14 is a diagram illustrating an example of a semantic category dictionary.
FIG. 15 is a flowchart illustrating an example of a search process according to the second embodiment.

FIG. 14 is a diagram illustrating an example of the semantic category dictionary stored in the semantic category dictionary storage unit 1056. As shown in FIG. 14, the semantic category dictionary storage unit 1056 stores therein a semantic category dictionary in which words and the semantic categories of the words are associated with each other.

Returning to FIG. 13, the search unit 1095 searches for sentences similar to the character string recognized by the recognition unit 90 from the parallel translation storage unit 1052 with reference to the semantic category dictionary.

FIG. 15 is a flowchart illustrating the details of the search process of the search unit 1095 according to the second embodiment.

The search unit 1095 divides the character string recognized by the recognition unit 90 into a plurality of words with reference to the semantic category dictionary (Step S300).

That is, the search unit 1095 performs a morphological analysis on the character string recognized by the recognition unit 90.

Then, the search unit 1095 specifies the semantic category of each of the divided words (Step S302). Specifically, when the input receiving unit 85 receives a Japanese speech, the search unit 1095 specifies the semantic category of each word divided from the Japanese character string recognized by the recognition unit 90, with reference to the semantic category dictionary. Similarly, when the input receiving unit 85 receives an English speech, the search unit 1095 specifies the semantic category of each word divided from the English character string recognized by the recognition unit 90, with reference to the semantic category dictionary.

Next, the parallel translation storage unit 1052 will be described below. The parallel translation storage unit 1052 stores therein Japanese sentences and English sentences forming the parallel translations so as to be associated with the semantic categories. FIG. 16 is a diagram illustrating an example of the Japanese sentences forming the parallel translations stored in the parallel translation storage unit 1052. In the example shown in FIG. 16, the semantic categories are associated with the Japanese sentences forming parallel translations. FIG. 17 is a diagram illustrating an example of the English sentences forming parallel translations stored in the parallel translation storage unit 1052. In the example shown in FIG. 17, the semantic categories are associated with the English sentences forming the parallel translations. For example, in FIGS. 16 and 17, a semantic category "greeting" is associated with the Japanese sentence 120 and the English sentence 220, and a semantic category "clothes" is associated with a Japanese word 161 and an English word 261. The semantic categories may be given to the Japanese sentences and the English sentences forming the parallel translations in Steps S300 and S302 of the flowchart shown in FIG. 15.

Returning to FIG. 15, then, the search unit 1095 compares the semantic category of each of the divided words with the semantic category of each of a plurality of words forming the sentences stored in the parallel translation storage unit 1052 and searches for sentences similar to the character string recognized by the recognition unit 90 (Step S304). Specifically, when the input receiving unit 85 receives a Japanese speech, the search unit 1095 compares the semantic category of each word divided from the Japanese character string with the semantic category of each of a plurality of words forming the Japanese sentences shown in FIG. 16 which are stored in the parallel translation storage unit 1052 and searches for Japanese sentences similar to the Japanese character string recognized by the recognition unit 90. Similarly, when the input receiving unit 85 receives an English speech, the search unit 1095 compares the semantic category of each word divided from the English character string with the semantic category of each of a plurality of words forming the English sentences shown in FIG. 17 which are stored in the parallel translation storage unit 1052 and searches for English sentences similar to the English character string recognized by the recognition unit 90. For example, the search unit 1095 calculates the similarity between sentences using the Dice coefficient represented by Expression 3, the Jaccard coefficient represented by Expression 4, or the cosine coefficient represented by Expression 5.

For example, semantic categories "head.eye and nose.face" and "consciousness.sense" are associated with a Japanese sentence 171 shown in FIG. 16, the semantic categories "head.eye and nose.face" and "consciousness.sense" are associated with a Japanese sentence 172, and semantic categories "clothes" and "subsumption" are associated with a Japanese sentence 173.

In this case, the similarity between the Japanese sentence 171 and the Japanese sentence 172 and the similarity between the Japanese sentence 171 and the Japanese sentence 173 are calculated using Expression 3 as follows. In the following description, it is assumed that the Japanese sentence 171 is sentence 1, the Japanese sentence 172 is sentence 2, and the Japanese sentence 173 is sentence 3.

$$\sigma(\text{sentence 1, sentence 2})=2*(e(\text{head.eye and nose.face, sentence 1})*e(\text{head.eye and nose.face, sentence 2})+e(\text{consciousness.sense, sentence 1})*e(\text{consciousness.sense, sentence 2}))/((e(\text{head.eye and nose.face, sentence 1})^2+e(\text{consciousness.sense, sentence 1})^2)+(e(\text{head.eye and nose.face, sentence 2})^2+e(\text{consciousness.sense, sentence 2})^2))=2*(1*1+1*1)/((1^2+1^2)+(1^2+1^2))=1$$

$$\sigma(\text{sentence 1, sentence 3})=2*(e(\text{head.eye and nose.face, sentence 1})*e(\text{head.eye and nose.face, sentence 2})+e(\text{consciousness.sense, sentence 1})*e(\text{consciousness.sense, sentence 2})+e(\text{clothes, sentence 1})*e(\text{clothes, sentence 2})+e(\text{subsumption, sentence 1})*e(\text{subsumption, sentence 2}))/((e(\text{head.eye and nose.face, sentence 1}))^2+e(\text{consciousness.sense, sentence 1})^2)+(e(\text{clothes, sentence 2})^2+e(\text{subsumption, sentence 2})^2))=2*(1*0+1*0+0*1+0*1)/(1^2+1^2)+(1^2+1^2))=0$$

As a result, since σ(sentence 1, sentence 2)=1 is established, the Japanese sentence 171 is similar to the Japanese sentence 172. Since σ(sentence 1, sentence 3)=0 is established, the Japanese sentence 171 is not similar to the Japanese sentence 173. In addition, e(x, s) is a function which outputs 1 when there is a semantic category x in a sentence s and outputs 0 when there is no semantic category x in the sentence s.

As described above, the use of the semantic category dictionary makes it possible to search for similar sentences. Information indicating whether the sentence is an interrogative sentence or an affirmative sentence is also important in the calculation of the similarity between sentences. Therefore, such information may be used to calculate the similarity.

Hardware Structure

Figure 18:
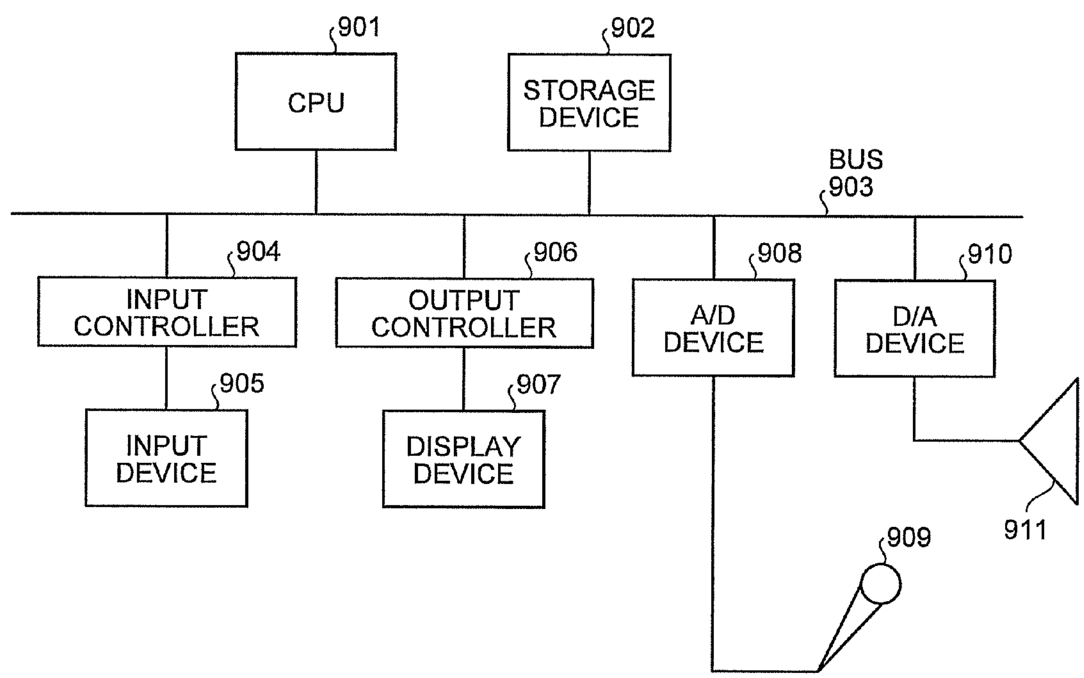
FIG. 18 is a diagram illustrating the hardware structure of the translation devices according to the first and second embodiments.

FIG. 18 is a block diagram illustrating an example of the hardware structure of the translation devices 1 and 1001 according to the first and second embodiments. As shown in FIG. 18, each of the translation devices 1 and 1001 according to the first and second embodiments includes a CPU 901, a storage device 902 including, for example, a ROM, a RAM, and an HDD, a microphone 909 that inputs the speech of the user, an A/D device 908 that performs A/D conversion on the input speech, a D/A device 910 that converts, for example, the translation result into a speech, a speaker 911 that outputs the speech, an input device 905, such as a keyboard, a mouse, or a pen, an input controller 904 that controls the input device 905, a display device 907, such as a display, an output controller 906 that controls the display device 907, and a bus 903 that connects the modules, and has a hardware structure of a general computer.

A translation program executed by the translation devices 1 and 1001 according to the first and second embodiments is recorded as a file of an installable format or an executable format on a computer-readable recording medium, such as a CD-ROM, a flexible disk (FD), a CD-R, or a Digital Versatile Disk (DVD) and then provided as a program product. The translation program executed by the translation devices 1 and 1001 according to the first and second embodiments may be incorporated into, for example, a ROM in advance and then provided.

The translation program executed by the translation devices 1 and 1001 according to the first and second embodiments has a module structure for implementing each of the above-mentioned components on a computer. As the actual hardware, the CPU reads the translation program from the HDD, loads the translation program on the RAM, and executes the translation program. Then, each of the above-mentioned units is implemented on the computer.

Modifications

The invention is not limited to the above-described embodiments, but the components in practice may be changed and implemented without departing from the scope and spirit of the invention. In addition, a plurality of components according to the above-described embodiments may be appropriately combined with each other to form various kinds of structures. For example, some of the components according to the above-described embodiments may be removed. In addition, the components according to different embodiments may be appropriately combined with each other.

For example, when the search unit 95 or 1095 searches for similar sentences, in general, it is preferable that priority be given to the sentence which is acquired by the acquiring unit 75 as the candidates of the next utterance among the sentences stored in the parallel translation storage unit 52 or 1052. Therefore, the search unit 95 or 1095 may increase the priority of the sentence which is acquired by the acquiring unit 75 among the sentences stored in the parallel translation storage unit 52 or 1052 and search for sentences similar to the character string recognized by the recognition unit 90 from the parallel translation storage unit 52 or 1052.

Specifically, when the input receiving unit 85 receives a Japanese speech, the search unit 95 or 1095 increases the priority of the Japanese sentence which is acquired by the acquiring unit 75 among the Japanese sentences stored in the parallel translation storage unit 52 or 1052 and searches for Japanese sentences similar to the Japanese character string from the parallel translation storage unit 52 or 1052. Similarly, when the input receiving unit 85 receives an English speech, the search unit 95 or 1095 increases the priority of the English sentence which is acquired by the acquiring unit 75 among the English sentences stored in the parallel translation storage unit 52 or 1052 and searches for English sentences similar to the English character string from the parallel translation storage unit 52 or 1052.

For example, it is possible to give priority to the sentence which is acquired as the candidate of the next utterance using Expression 6.

$$\text{Score}((S_i, l_i)|(S_j, l_j))=\alpha*\text{Score}((S_i, l_i)|(S_j, l_j)\in\text{candidate group of next utterance})+(1-\alpha)*\text{Score}((S_i, l_i)|(S_j, l_j)\in\text{parallel translation example storage unit}) \quad (6)$$

In Expression 6, $0<\alpha<1$ is satisfied.

According to at least one embodiment, it is possible to predict the next utterance of the user at a low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A translation device comprising:

a parallel translation storage unit configured to store therein a plurality of parallel translations and their respective IDs so as to be associated with each other, each of the parallel translations including a sentence in a first language and a sentence in a second language having an equivalent semantic content so as to be associated with each other;

a next utterance table storage unit configured to store therein a next utterance table in which first identification information, second identification information, and frequency information are associated with each other, the first identification information having the ID and distinguishing between the sentence in the first language and the sentence in the second language included in the parallel translation indicated by the ID, the second identification information identifying a sentence which has been previously selected as a next utterance of the sentence indicated by the first identification information from the parallel translation storage unit; and the frequency information indicating a frequency of selection of the sentence indicated by the second identification information that is selected as the next utterance of the sentence indicated by the first identification information;

a translation unit configured to translate a first selected sentence in the first language into a sentence in the second language using the parallel translations;

an update unit configured to update the frequency information associated with the first identification information of a previously selected sentence and associated with the second identification information of the first selected sentence;

an acquiring unit configured to acquire, from the parallel translation storage unit, within a predetermined number of ranges, next utterance candidates, which are sentences respectively indicated by a plurality of pieces of the second identification information which are associated with the first identification information of the first selected sentence in descending order of the frequency of selection indicated by the frequency information, with reference to the next utterance table;

a display unit configured to display the first selected sentence, a translation result of the first selected sentence, and the next utterance candidates; and a selection receiving unit configured to receive a selection of any one of the next utterance candidates, wherein, if the selected next utterance candidate is the first language, the translation unit translates the selected next utterance candidate into the second language using the parallel translations, if the selected next utterance candidate is the second language, the translation unit translates the selected next utterance candidate into the first language using the parallel translations.

2. The device according to claim 1, wherein the acquiring unit acquires, from the parallel translation storage unit, within a predetermined number ranges, next utterance candidates in the first language, which are the sentences in the first language respectively indicated by a plurality of pieces of second identification information which are associated with the first identification information of the first selected sentence in descending order of the frequency of use indicated by the frequency information, with reference to the next utterance table, and the acquiring unit acquires, from the parallel translation storage unit, within a predetermined number range, next utterance candidates in the second language, which are the sentences in the second language respectively indicated by the plurality of pieces of second identification information which are associated with the first identification information of the first selected sentence in descending order of the frequency of use indicated by the frequency information, with reference to the next utterance table.

3. The device according to claim 1, further comprising:

an input receiving unit configured to receive an input of a speech uttered in the first language or the second language;

a recognition unit configured to, when the speech is of the first language, recognize the speech and generates a first character string of the first language, but when the speech is of the second language, recognize the speech and generates a second character string of the second language; and a search unit configured to search for sentences in the first language similar to the first character string from the parallel translation storage unit when the speech is of the first language, and search for sentences in the second language similar to the second character string from the parallel translation storage unit when the speech is of the second language, wherein, when the speech is of the first language, the display unit displays the first character string and the searched sentences in the first language as the next utterance candidates of the first sentence in the first language, but when the speech is of the second language, the display unit displays the second character string and the searched sentences in the second language as the next utterance candidates of the first sentence in the second language.

4. The device according to claim 3, further comprising:

a semantic category dictionary storage unit configured to store therein a semantic category dictionary in which words are associated with semantic categories of the words, wherein, when the speech is of the first language, the search unit compares the semantic categories of a plurality of words forming the first character string with the semantic categories of a plurality of words forming the sentence of the first language stored in the parallel translation storage unit and searches for sentences in the first language similar to the first character string, and when the speech is of the second language, the search unit compares the semantic categories of a plurality of words forming the second character string with the semantic categories of a plurality of words forming the sentence of the second language stored in the parallel translation storage unit and searches for sentences of the second language similar to the second character string.

5. The device according to claim 3, wherein, when the speech is of the first language, the search unit increases the priority of the sentence in the first language acquired by the acquiring unit among the sentences in the first language stored in the parallel translation storage unit and searches for sentences in the first language similar to the first character string from the parallel translation storage unit, and when the speech is of the second language, the search unit increases the priority of the sentence in the second language acquired by the acquiring unit among the sentences in the second language stored in the parallel translation storage unit and searches for a sentence in the second language similar to the second character string from the parallel translation storage unit.

6. A computer program product comprising a non-transitory computer readable medium including programmed instructions, wherein the instructions, when executed by a computer, cause the computer to perform:

translating a first selected sentence in a first language into a sentence in a second language using a plurality of parallel translations stored in a parallel translation storage unit that stores therein the parallel translations and their respective IDs so as to be associated with each other, each of the parallel translations including a sentence in the first language and a sentence in the second language having an equivalent semantic content so as to be associated with each;

with reference to a next utterance table which is stored in a next utterance table storage unit and in which first identification information, second identification information, and frequency information are associated with each other, the first identification information having the ID and distinguishing between the sentence in the first language and the sentence in the second language included in the parallel translation indicated by the ID, the second identification information identifying a sentence which has been previously selected as a next utterance of the sentence indication by the first identification information from the parallel translation storage unit, and the frequency information indicating a frequency of selection of the sentence indicated by the second identification information that is selected as the next utterance of the sentence indicated by the first identification information, updating the frequency information associated with the first identification information of a previously selected sentence and associated with the second identification information of the first sentence;

acquiring, from the parallel translation storage unit, within a predetermined number ranges, next utterance candidates, which are sentences respectively indicated by a plurality of pieces of the second identification information which are associated with the first identification information of the first selected sentence in descending order of the frequency of selection indicated by the frequency information, with reference to the next utterance table displaying the first selected sentence, a translation result of the first selected sentence, and the next utterance candidates; and receiving a selection of any one of the next utterance candidates, wherein, if the selected next utterance candidate is the first language, the translating includes translating the selected next utterance candidate into the second language using the parallel translations, if the selected next utterance candidate is the second language, the translating includes translating the selected next utterance candidate into the first language using the parallel translations.

* * * * *